United States Patent
Zhao

(10) Patent No.: US 11,563,552 B2
(45) Date of Patent: Jan. 24, 2023

(54) INFORMATION PROCESSING METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Zhenshan Zhao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/397,812

(22) Filed: Aug. 9, 2021

(65) Prior Publication Data

US 2021/0367745 A1   Nov. 25, 2021

Related U.S. Application Data

(63) Continuation of application No. PCT/CN2019/090999, filed on Jun. 12, 2019.

(51) Int. Cl.
*H04L 5/00* (2006.01)
*H04W 72/14* (2009.01)

(52) U.S. Cl.
CPC .......... *H04L 5/0098* (2013.01); *H04L 5/0082* (2013.01); *H04W 72/14* (2013.01)

(58) Field of Classification Search
CPC ..... H04L 5/0098; H04L 5/0082; H04W 72/14
See application file for complete search history.

(56) References Cited

U.S. PATENT DOCUMENTS

| | | | | |
|---|---|---|---|---|
| 2006/0248429 | A1* | 11/2006 | Grandhi | H04L 1/1671 714/749 |
| 2016/0134351 | A1* | 5/2016 | Choi | H04B 7/0619 370/328 |
| 2018/0160418 | A1 | 6/2018 | Luo et al. | |
| 2019/0319745 | A1* | 10/2019 | Pan | H04L 1/0072 |

(Continued)

FOREIGN PATENT DOCUMENTS

| | | |
|---|---|---|
| CN | 107295645 A | 10/2017 |
| CN | 107734543 A | 2/2018 |

(Continued)

OTHER PUBLICATIONS

International Search Report in the international application No. PCT/CN2019/090999, dated Mar. 19, 2020.

(Continued)

*Primary Examiner* — Kevin M Cunningham
(74) *Attorney, Agent, or Firm* — Ladas & Parry, LLP

(57) ABSTRACT

Disclosed in the present invention are an information processing method, a terminal device, a network device, a chip, a computer readable storage medium, a computer program product, and a computer program. The method comprises: receiving indication information sent by a network device for activating or deactivating CG; and feeding back confirmation information to the network device, wherein the confirmation information is information fed back over a carrier satisfying a preset condition, and/or the content of the confirmation information comprises at least one of the followings: a cell group identifier, a carrier identifier, a CG identifier, and a CG group identifier.

9 Claims, 18 Drawing Sheets

(56) References Cited

U.S. PATENT DOCUMENTS

2020/0314889 A1* 10/2020 Cirik .................... H04L 5/0098
2021/0084518 A1* 3/2021 Fan ..................... H04B 7/0632
2021/0314982 A1* 10/2021 Panteleev ............. H04W 72/14

FOREIGN PATENT DOCUMENTS

| CN | 108476507 A | 8/2018 |
|---|---|---|
| CN | 10864852 A | 12/2018 |
| WO | 2016176965 A1 | 11/2016 |

OTHER PUBLICATIONS

3GPP TS 38.321 V16.2.1 (Sep. 2020), 3rd Generation Partnership Project; Technical Specification Group Radio Access Network; NR; Medium Access Control (MAC) protocol specification (Release 16), entire document.
3GPP TS 38.212 V16.2.0 (Jun. 2020), 3rd Generation Partnership Project; Technical Specification Group Radio Access Network; NR; Multiplexing and channel coding (Release 16), entire document.
3GPP TS 38.213 V16.2.0 (Jun. 2020), 3rd Generation Partnership Project; Technical Specification Group Radio Access Network; NR; Physical layer procedures for control (Release 16), entire document.
3GPP TS 38.331 V16.2.0 (Sep. 2020), 3rd Generation Partnership Project; Technical Specification Group Radio Access Network; NR; Radio Resource Control (RRC) protocol specification (Release 16), entire document.
Written Opinion in the international application No. PCT/CN2019/090999, dated Mar. 19, 2020.
Ericsson : "Report of Email Discussion [105#51] [NR-U] Configured Grants (Ericsson )", 3GPP DRAFT;R2-1904742, 3rd Generation Partnership Project ( 3GPP), Mobile Competence Centre; 650, Route Des Lucioles ; F-06921 Sophia-Anti Polis Cedex; France vol. RAN WG2, no. Xi ' an, China; Apr. 8, 2019-Apr. 12, 2019 Apr. 6, 2019 (Apr. 6, 2019), XP051702021,Retrieved from the Internet:URL:http://www.3gpp.org/ftp/Meetinqs 5F3GPP5FSYNC/RAN2/DOCS/R2 2D1904742 2Ezip[retrieved on Apr. 6, 2019].
Ericsson : "Report of Email Discussion [105#51] [NR-U] Configured Grants (Ericsson )", 3GPP Draft;R2-1904742, 3rd Generation Partnership Project ( 3GPP), Mobile Competence Centre; 650, Route Des Lucioles ; F-06921 Sophia-Antipolis Cedex; France vol. RAN WG2, no. Xi ' an, China; Apr. 8, 2019-Apr. 12, 2019 Mar. 29, 2019 (Mar. 29, 2019), XP051693931,Retrieved from the Internet:URL:http://www.3gpp.orq/ftp/tsq 5Fran/WG25FRL2/TSGR2% 5F105bis/Docs/R2%2D1904742 2Ezip[retrieved on Mar. 29, 2019].
Supplementary European Search Report in European application No. 19932845.1, dated Jan. 21, 2022.
First Office Action of the Chinese application No. 202110802899.9, dated Apr. 6, 2022, with search report.
First Office Action of the European application No. 19932845.1, dated Oct. 20, 2022.
Office Action in the corrsponding Indian application No. 202127041161, dated Dec. 7, 2022.

* cited by examiner

| R | R | R | CG index | Oct 1 |
|---|---|---|----------|-------|
| R | R | R | CG index | Oct 2 |

... ...

| R | R | R | CG index | Oct 7 |
|---|---|---|----------|-------|
| R | R | R | CG index | Oct 8 |

FIG. 8

Second communication unit 71

FIG. 15

INFORMATION PROCESSING METHOD, NETWORK DEVICE, AND TERMINAL DEVICE

CROSS-REFERENCE TO RELATED APPLICATION

The present disclosure is a U.S. continuation application of International Application No. PCT/CN2019/090999, filed on Jun. 12, 2019. The contents of this application are incorporated herein by reference in its entirety.

BACKGROUND

According to the current protocol, when the Configured Grant Confirmation (CG) is instructed by the network for the terminal device to activate or deactivate, the terminal device needs to trigger a configured uplink grant resource confirmation. If the configured uplink grant confirmation is triggered and there is uplink resource for new transmission, Configured Grant Confirmation Media Access Control (MAC) Control Element (CE) is through by the process that the MAC indicates the multiplexing packet grouping, and the triggered Configured uplink grant confirmation is cancelled. The Configured Grant Confirmation MAC CE is identified by the Logic Channel Identification (LCID) in the MAC sub-header, i.e., the confirmation information is carried by the MAC CE, and MAC CE does not carry any message.

However, this may cause a case that the terminal device and the network use the CG configuration differently, and may cause a problem that the Quality of Service (QoS) of the service transmission cannot meet a requirement. In addition, no specific processing solutions are currently provided for how to feed some certain indication information back.

SUMMARY

The present disclosure relates to the technical field of information processing, and particularly, to a method for processing information, a network device, a terminal device, a chip, a computer readable storage medium, a computer program product, and a computer program.

To solve the above technical problems, the embodiments of the present disclosure provide a method for processing information, a network device, a terminal device, a chip, a computer readable storage medium, a computer program product, and a computer program.

According to a first aspect, a method for processing information is provided. The method is applied to a terminal device and includes the following operations.

Indication information sent by a network device for activation or deactivation of a Configured Grant Confirmation (CG) is received.

Confirmation information is fed back to the network device.

The confirmation information is information fed back on a carrier that meets a preset condition, and/or the confirmation information contains at least one of the following: a cell group index, a carrier index, a CG index, and a CG group index According to a second aspect, a method for processing information is provided, The method is applied to a network device, and includes the following operations.

Indication information for activation or deactivation of a Configured Grant Confirmation (CG) is transmitted to a terminal device.

Confirmation information fed back by the terminal device is received.

The confirmation information is information fed back on a carrier that meets a preset condition, and/or the confirmation information contains at least one of the following: a cell group index, a carrier index, a CG index, and a CG group index.

According to a third aspect, a terminal device is provided. The terminal device includes a first communication unit.

The first communication unit is configured to receive indication information sent by a network device for activation or deactivation of a Configured Grant Confirmation (CG) and feed confirmation information back to the network device The confirmation information is information fed back on a carrier that meets a preset condition, and/or the confirmation information contains at least one of the following: a cell group index, a carrier index, a CG index, and a CG group index.

According to a fourth aspect, a network device is provided. The network device includes a second communication unit.

The second communication unit is configured to transmit indication information for activation or deactivation of a Configured Grant Confirmation (CG) to a terminal device and receive confirmation information fed back by the terminal device.

The confirmation information is information fed back on a carrier that meets a preset condition, and/or the confirmation information contains at least one of the following: a cell group index, a carrier index, a CG index, and a CG group index According to a fifth aspect, a terminal device including a processor and a memory is provided. The memory is configured to store computer programs, and the processor is configured to call and execute the computer programs stored in the memory to perform the method of the first aspect or various implementations thereof.

In a sixth aspect, a network device including a processor and a memory is provided. The memory is configured to store computer programs, and the processor is configured to call and execute the computer programs stored in the memory to perform the method of the second aspect or various implementations thereof.

According to a seventh aspect, a chip is provided for implementing the method in each of the above implementations.

Specifically, the chip includes a processor configured to call and execute computer programs stored in a memory to cause a device on which the chip is mounted to perform the method in any one of the first aspect and the second aspect, or various implementations of the first aspect and the second aspect as described above.

According to an eighth aspect, a computer readable storage medium is provided. The computer readable storage medium is for storing a computer programs, and the computer programs causes a computer to perform the method in any one of the first aspect and the second aspect, or various implementations of the first aspect and the second aspect as described above According to a ninth aspect, a computer program product is provided. The computer program product includes computer program instructions which cause a computer to perform the method in any one of the first aspect and the second aspect, or various implementations of the first aspect and the second aspect as described above.

According to a tenth aspect, computer programs are provided. When the computer programs are executed on a computer, the computer performs the method in any one of the first aspect and the second aspect, or various implementations of the first aspect and the second aspect as described above.

BRIEF DESCRIPTION OF THE DRAWINGS

FIG. 6-FIG. 10 are schematic diagrams of MAC CE formats according to embodiments of the present disclosure.

FIG. 15 is a schematic structural diagram of a network device according to embodiments of the present disclosure.

DETAILED DESCRIPTION

By using the solutions provided in the embodiments of the present disclosure, when the confirmation information is fed back to the network device after the indication information, indicating activation or deactivation of the CG, of the network device is received, the confirmation information is generated by a certain preset condition, or the confirmation information is generated by including one of a cell group index, a carrier index, a CG index, and a CG group index in the confirmation information. Thus, the problem that there is no solution in the prior art about how does the UE feed the activation/deactivation confirmation information of CG back is solved, and the problem of inconsistent understanding of the confirmation information between the network device and the terminal device is avoided by adding the relevant information of the carrier, CG or CG group into the confirmation information.

In order to understand the characteristics and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

The technical solutions in the embodiments of the present disclosure will be described with reference to the accompanying drawings of the embodiments of the present disclosure. It is apparent that the described embodiments are part of, but not all, embodiments of the present disclosure. Based on the embodiments in the present disclosure, all other embodiments obtained by a person of ordinary skill in the art without creative work fall within the scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Frequency Division Duplex (FDD) system, an Time Division Duplex (TDD), a Universal Mobile Telecommunication System (UMTS), a Worldwide Interoperability for Microwave Access (WiMAX) communication system, or a 5G system.

Figure 1:
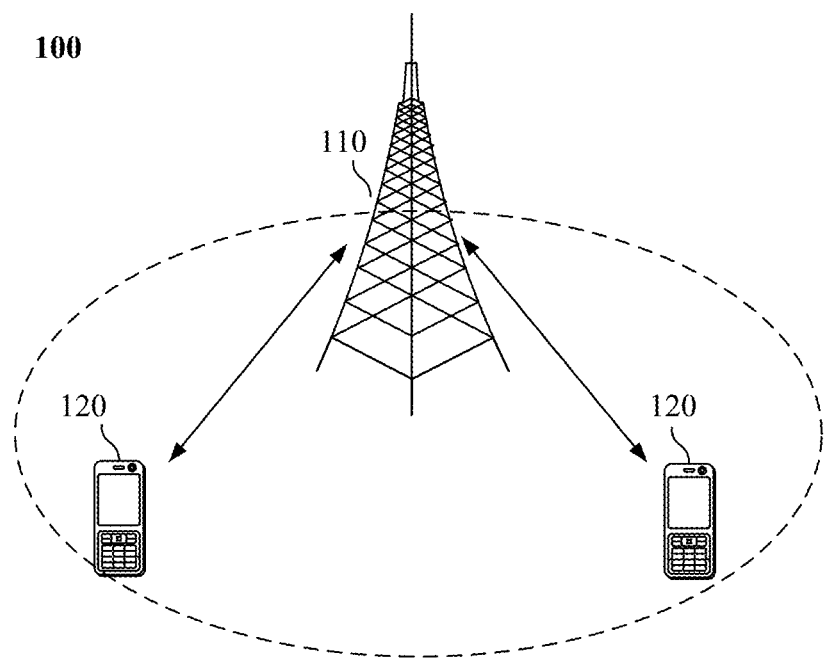
FIG. 1 is a first schematic diagram of a communication system architecture according to embodiments of the present disclosure.

Illustratively, the communication system 100 applied in the embodiments of the present disclosure may be shown in FIG. 1. The communication system 100 may include a network device 110, which may be a device that communicates with a UE 120 (or referred to as a communication terminal or a terminal). The network device 110 may provide communication coverage for a particular geographic area and may communicate with UEs located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a Public Land Mobile Network (PLMN), or the like.

The communication system 100 further includes at least one UE 120 located within coverage of the network device 110. Herein, "UE" includes, but is not limited to, connections via wired lines, such as via a Public Switched Telephone Networks (PSTN), a Digital Subscriber Line (DSL), a digital cable, a direct cable connection; and/or another data connection/network; and/or via a wireless interface, e.g., a wireless interface for a cellular network, a Wireless Local Area Network (WLAN), a digital television network such as the DVB-H network, a satellite network, a AM-FM broadcast transmitter; and/or apparatus of another UE configured to receive/transmit communication signals; and/or Internet of Things (IoT) devices. A UE configured to communicate through a wireless interface may be referred to as "a wireless communication terminal", "a wireless terminal" or "a mobile terminal".

Optionally, Device to Device (D2D) communication may be performed between the UEs 120.

It should be understood that the terms "system" and "network" are used interchangeably herein. The term "and/or," as used herein, is merely an association that describes an associated object, meaning that there may be three relationships, e.g., A and/or B may represent three conditions: i.e., independent existence of A, existence of both A and B, and independent existence of B. In addition, the character "/" generally indicates that relationship between the associated objects is "or".

In order to understand the characteristics and technical contents of the embodiments of the present disclosure in more detail, the implementation of the embodiments of the present disclosure will be described in detail with reference to the accompanying drawings, which are provided for purposes of illustration only and are not intended to limit the embodiments of the present disclosure.

Figure 2:
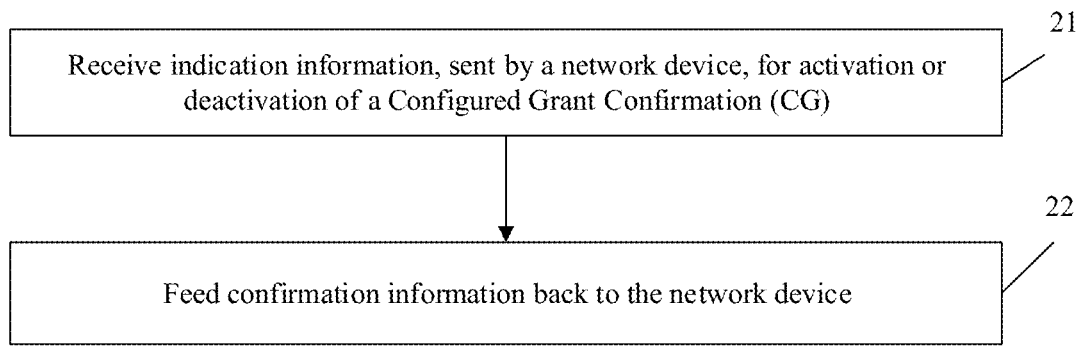
FIG. 2 is a first schematic flowchart of a method for process information according to embodiments of the present disclosure.

Embodiments of the present disclosure provide a method for processing information, which is applied to a terminal device. As shown in FIG. 2, the method includes the following operations.

In operation 21, indication information, sent by a network device, for activation or deactivation of a CG is received.

In operation 22, confirmation information is fed back to the network device.

The confirmation information is information fed back on a carrier that meets a preset condition, and/or the confirmation information contains at least one of the following: a cell group index, a carrier index, a CG index, and a CG group index.

Figure 3:
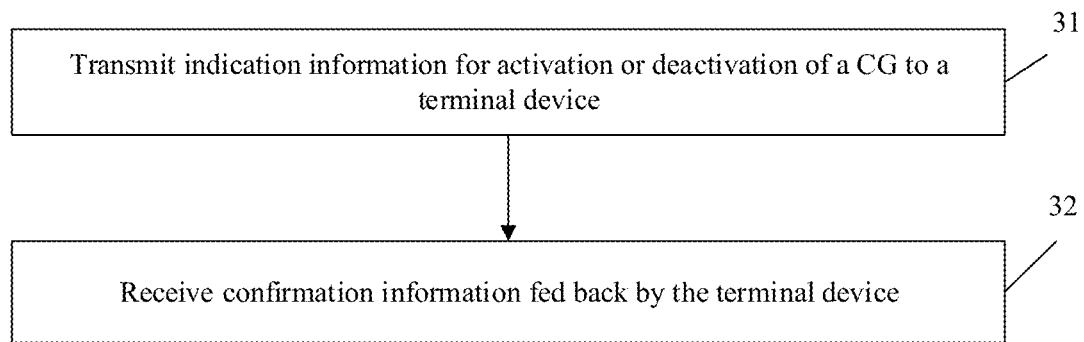
FIG. 3 is a second schematic flowchart of a method for processing information according to embodiments of the present disclosure.

In addition, the method for processing information provided by the embodiments also includes processing of the network device side. As shown in FIG. 3, the method includes the following operations.

In operation 31, indication information of activation or deactivation for a CG is transmitted to the terminal device.

In operation 32, confirmation information fed back by the terminal device is received.

The confirmation information is information fed back on a carrier that meets a preset condition, and/or the confirmation information contains at least one of the following: a cell group index, a carrier index, a CG index, and a CG group index.

In the embodiments, the network device may be a base station device in the network side, such as a gNB.

The situations of different scenarios for the present disclosure are described in the following with reference to the types of the plurality of indication information.

Scenario 1

The operation that the indication information of activation or deactivation for the CG is transmitted to the terminal device includes the following operation.

The first indication information is transmitted to a terminal device.

The first indication information includes M CGs which are instructed by the network device for the terminal device to activate or deactivate, and M is an integer greater than or equal to 1.

Alternatively, the first indication information comprises at least one group of CGs which are instructed by the network device for the terminal device to activate or deactivate, and each group of the at least one group of CGs comprises at least one CG.

That is, the terminal device receives the first indication information sent from the network device.

The first indication information includes M CGs which are instructed by the network device for the terminal device to activate or deactivate, and M is an integer greater than or equal to 1.

Alternatively, the first indication information comprises at least one group of CGs which are instructed by the network device for the terminal device to activate or deactivate, and each group of the at least one group of CGs comprises at least one CG.

The first indication information in this scenario may be DownLink Control Information (DCI) information. In particular, the network device uses Combined DCI for indicating.

In addition, before the above processing, the network device may perform CG configuration for the terminal device. For example, when the network device is gNB, the gNB configures multiple CGs in a group configuration manner. For example, the gNB configures four CGs for the UE. Alternatively, the CG index 1 and CG index 2 may be directly configured as a group by the network device, i.e., the CG group 1, i.e., the group index is "1". The CG index 3 and CG index 4 are configured as a group, i.e., the CG group 2, where the group index is "2".

When the network device transmits the first indication information to the terminal device, a bitmap may be used. That is, the first indication information (i.e., Combined DCI) includes a bitmap.

Where a value of a length of the bitmap is a maximum number of CGs supported by the network device, or is a maximum number of CGs supported by the terminal device, or is a maximum number of CGs configured for the terminal device, or is a maximum number of CGs activated by the terminal device, or is a predefined number of CGs, or is a predefined maximum number of CGs, and different bits in the bitmap are used to indicate activation or deactivation of different CGs. For example, it may be set that when a bit value is 1, the CG indication corresponding to the bit is in an activated state, and when a bit value is 0, the CG indication corresponding to the bit is in a deactivated state. Of course, vice versa, and details are not described herein.

Alternatively, the value of the length of the bitmap is a maximum number of CG groups supported by the network device, or is a maximum number of CG groups supported by the terminal device, or is a maximum number of CG groups configured for the terminal device, or is a maximum number of CG groups activated by the terminal device, or is a predefined number of CG groups, or is a predefined maximum number of CG groups, and different bits in the bitmap are used to indicate activation or deactivation of different CG groups. That is, when the network device configures the multiple CGs in a group configuration manner, the network device may indicate activation/deactivation in a CG group manner. In this case, the first indication information, i.e., the DCI, carries the CG group index, and may not need to carry the CG index. A bit in the bitmap corresponds to a CG group. It may be set that a bit value being 1 represents that the network device indicates the activation of the CG group corresponding to the bit, and the bit value being 0 represents that the network device indicates the deactivation of the CG group corresponding to the bit. Of course, vice versa, and details are not described herein.

It should also be noted that the order of the CGs or CG groups in the bitmap may be an ascending or descending order of CG indexes or CG group indexes. Further, when indicating at least one carrier, the bitmap may be set by sorting CGs or CG groups of each carrier and in a manner of sorting the carriers.

When indicating at least one carrier and at least one cell group, the bitmap may be set in a manner of sorting the CG or CG group of each carrier, sorting the carriers and sorting the cell groups, or the bit may be set by sorting the CG and CG group of each cell group and in a manner of sorting the cell groups.

Based on the above, when the network device indicates the activation/deactivation state of the multiple CGs by using the combined DCI, the terminal device may report the confirmation state of whether the multiple CGs are activated by using the first confirmation information. That is, the terminal device feeds the first confirmation information for the first indication information back to the network device. Accordingly, the network device receives the first confirmation information for the first indication information fed back by the terminal device.

The first confirmation information may be carried by one of the following: a MAC CE, a physical (PHY) signaling, and a Radio Resource Control (RRC).

Figure 4:
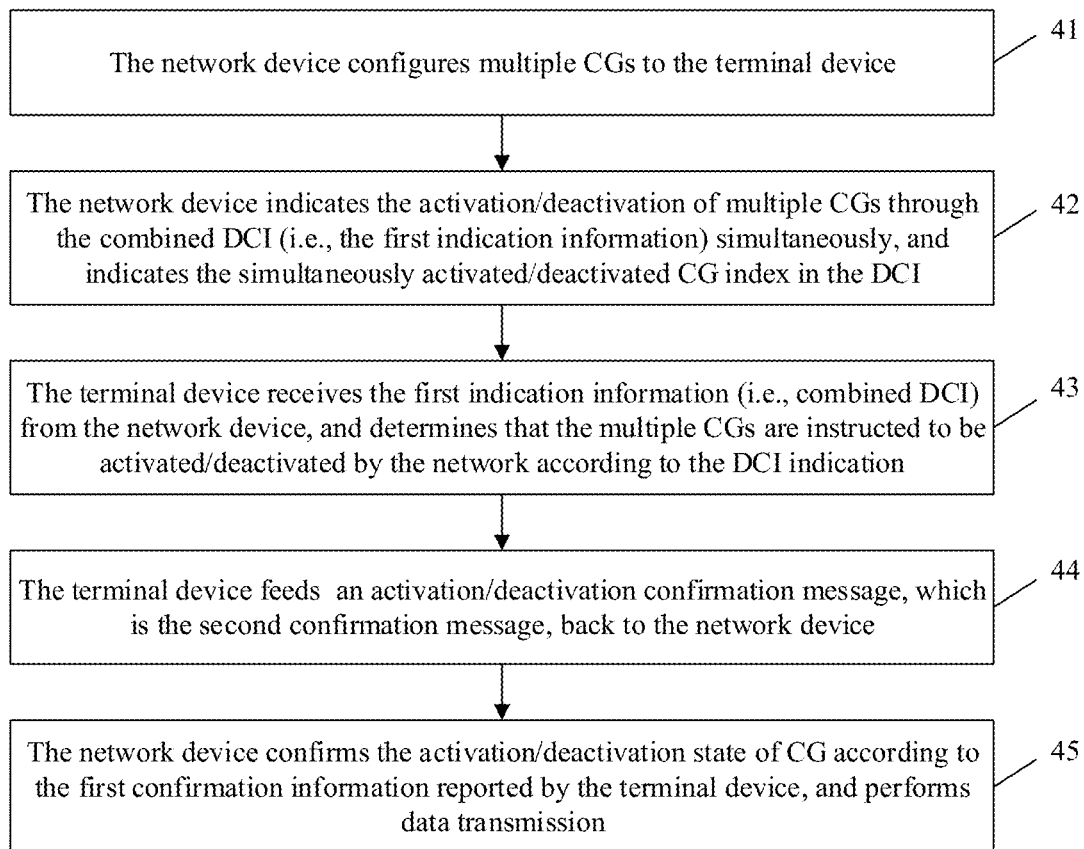
FIG. 4 is a third schematic flowchart of a method for processing information according to embodiments of the present disclosure.

Referring to FIG. 4, the processing solutions provided in the present scenario includes the following operations.

In operation 41, the network device configures the multiple CGs to the terminal device.

In operation 42, the network device indicates the activation/deactivation of the multiple CGs through the combined DCI (i.e., the first indication information) simultaneously, and indicates the simultaneously activated/deactivated CG index in the DCI.

In operation 43, the terminal device receives the first indication information (i.e., combined DCI) sent from the network device, and determines that the multiple CGs are activated/deactivated by the indication of network according to the DCI indication.

In operation 44, the terminal device feeds an activation/deactivation confirmation message back to the network device. The message is the first confirmation message.

In operation 45, the network device confirms the CG activation/deactivation state according to the first confirmation information reported by the terminal device, and performs data transmission.

Figure 5:
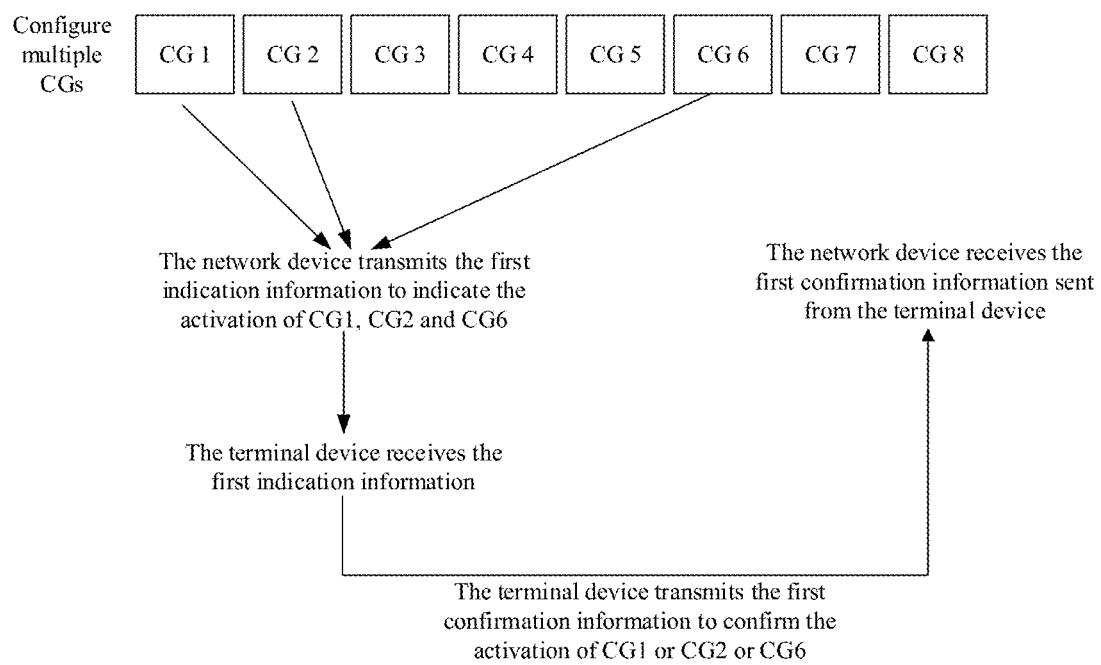
FIG. 5 is a fourth schematic flowchart of a method for processing information according to embodiments of the present disclosure.

Referring again to FIG. 5, an example is provided. The network device may configure multiple CGs for the terminal device, including CG1~CG8. The activation of CG1, CG2 and CG6 are indicated by first indication information. After receiving the first indication information, the terminal device may feed the first confirmation information back to the network device, and the confirmation information may be sent out in sequence, for example, each of the confirmation information confirms one of the CG1, CG2 and CG6. Accordingly, the network device may acquire the activated or deactivated CGs confirmed by the terminal device through receiving the first confirmation information, and then performs data transmission.

Further, in the present scenario, the format of the first confirmation information is described through the following categories. It should be noted that regardless of the type of the format used, a state of one CG or CG group may be fed back in the first confirmation information, or states of multiple CGs or CG groups may be fed back, which is specifically described as follows.

Category 1

When the first confirmation information is carried by the MAC CE, the MAC CE adopts a first LCD, and the MAC CE contains at least one of the following: the cell group index, the carrier index, the CG index, and the CG group index.

It should be understood that the first LCID is not identical to the LCID defined in the prior art, in particular LCID is other than 55.

Currently, the definition of LCID may be seen in Table 1.

| Number | LCID value |
|--------|------------|
| 0 | common control channel (CCCH) of size 64 bits |
| 1-32 | Identity of the logical channel |
| 33-51 | Reserved |
| 52 | CCCH of size 48 bits |
| 53 | Recommended bit rate query |
| 54 | Multiple Entry PHR (four octets Ci) |
| 55 | Configured Grant Confirmation |
| 56 | Multiple Entry Power Headroom Report (PHR) (one octet Ci) |
| 57 | Single Entry PHR |
| 58 | Cell Radio Network Temporary Identifier (C-RNTI) |
| 59 | Short Truncated Buffer Status Report (BSR) |
| 60 | Long Truncated BSR |
| 61 | Short BSR |
| 62 | Long BSR |
| 63 | Padding |

That is, a number of the first LCID in the present scenario is a number other than the above number, which may be configured according to the actual situation, which is not limited in the present embodiments.

In addition to introducing a new LCID in this category, it is set that additional information may be carried in the MAC CE. That is, another difference from the prior art is that content may be carried in the MAC CE, instead of the size=0.

By introducing a new LCID, a confirmation indication corresponding to simultaneous activation/deactivation of the multiple CGs is represented.

The new MAC CE carries at least one of the following: carrier index (UL or SUL), CG index, CG group index.

Figure 6:
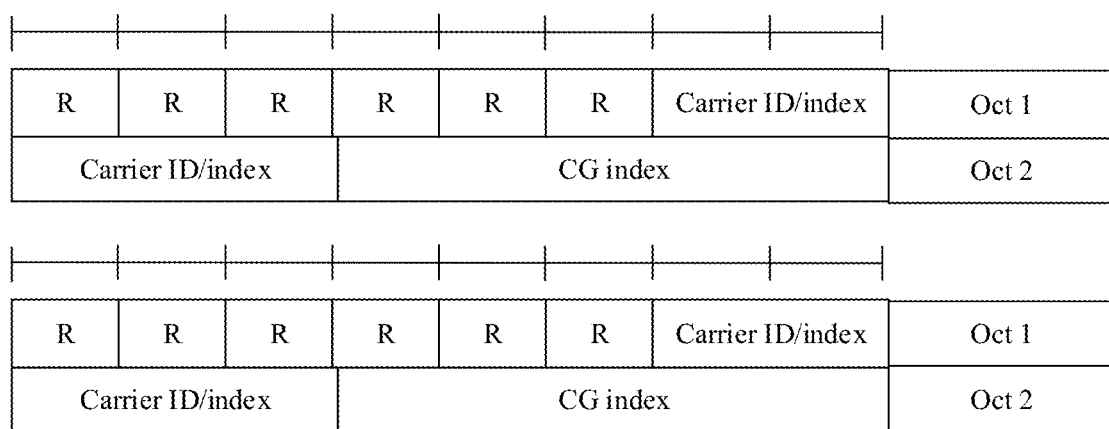

The number of CGs may be 8, 12, or 16. Referring to FIG. 6, taking 16 CGs as an example, a carrier index and a CG index may be added into the confirmation information to represent a confirmation for which CG is activated or deactivated. The carrier index or the carrier number is introduced since the base station configures the CG of one MAC entity separately for each carrier, and the CG indexes of two carriers may be the same, and the feedback is not limited to feeding back the corresponding confirmation information through the corresponding carrier.

Alternatively, a new feedback manner that LCID+adding crossed the cell group may be introduced.

It is the same as the above in that the first LCID may be introduced for identifying the MAC CE as the first confirmation information for simultaneous activation/deactivation of the corresponding multiple CGs.

Figure 7:
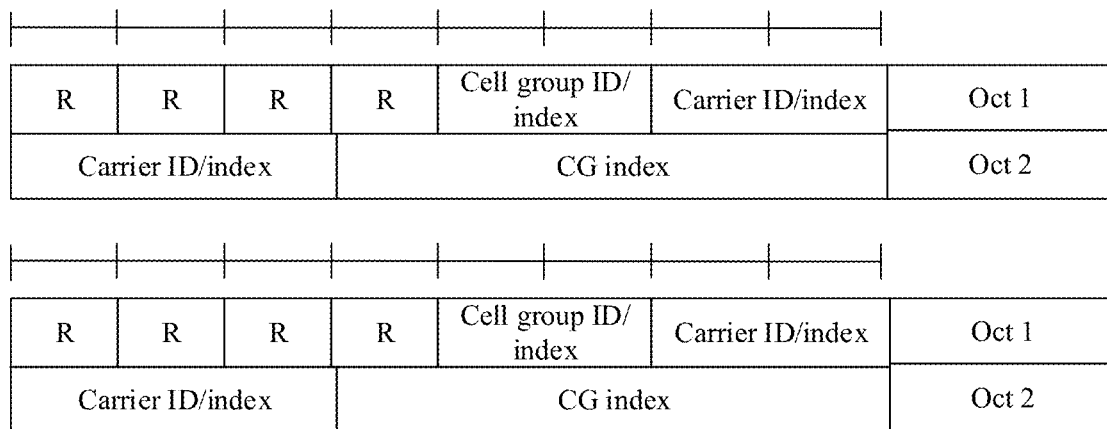

The new MAC CE may contain at least one of the following: cell group index, carrier index (UL or SUL), CG index, and CG group index The number of CGs may be 8, 12, or 16. Referring to FIG. 7, 16 CGs is used as an example for description. A difference from the above method is that a cell group index or a cell group number is introduced, which is mainly used for feedback crossing MAC entities. For example, when one MAC entity has no resources, a resource of another MAC entity may be used for feedback to reduce a delay.

Category 2

When the first confirmation information is carried by a MAC CE, the MAC CE adopts a second LCID, and the MAC CE does not include content, the second LCID being different from the first LCD.

The method further includes feeding back the first confirmation information through a corresponding carrier or a carrier that meets the preset condition.

It should be noted that in the present category, the second LCID may be numbered 55. That is, the configured grant resource confirmation information as specified in the prior art protocol.

That is, the Configured Grant Confirmation MAC CE of R15 is reused, but the usage limitations are increased. The advantage is that the existing protocols may be reused. However, since the one by one DCI indication mode and the combined DCI indication mode may coexist, it is necessary to specify usage limitation in the MAC protocol.

However, the present disclosure adds a limitation to it. That is, the first confirmation information only is fed back on a carrier corresponding to the first indication information or a carrier that meets a preset condition.

Specifically, there are following limitations.

Limitation 1: for a terminal device, when receiving the first indication information in a combined DCI mode indicating simultaneous activating/deactivating multiple CGs are activated/deactivated simultaneously, activation/deactivation of multiple CGs, the terminal device reports the confirmation by using the Configured Grant Confirmation MAC CE of R15. That is, the first indication information is transmitted.

Limitation 2: for the network side, when receiving the Configured Grant Confirmation MAC CE of R15 version transmitted by the terminal device of R16, the network side determines that the activation/deactivation state of the CG indicated by the combined DCI is confirmed by the UE, or the activation/deactivation state of the multiple CGs configured for the terminal device is confirmed by the UE.

The operation that the first confirmation information is fed back on a corresponding carrier or the carrier that meets the preset condition includes at least one of the following operations.

The first confirmation information is fed back on a first carrier corresponding to a carrier in which the first indication information is located.

The first confirmation information is fed back on a second carrier that is scheduled by the first indication information.

That is, the terminal device is limited to perform confirmation feedback on the corresponding carrier. For example, if combined DCI is received on the first carrier, confirmation feedback is performed on the first carrier. Alternatively, if combined DCI indicates the scheduling of the second carrier, confirmation feedback is performed on the second carrier.

It should also be noted that the first confirmation information may also be fed back in a corresponding cell or in a cell that meets the preset condition.

That is, there may be an alternative solution in the processing. That is, the above carrier may be replaced by a cell. That is, the first confirmation information is fed back in the cell of the first indication information, and/or the first confirmation information is fed back in the cell that is scheduled by the first indication information.

Further, if the terminal device may finally determine to only activate or deactivate a part of the CGs or CG groups in the combined DCI (i.e., the first indication information), the first confirmation information may also be fed back on the CG or CG group resource that corresponds to a corresponding carrier or a carrier that meets the preset condition.

Optionally, the size of MAC CE is fixed and size=0. That is, activation or deactivation of multiple CGs is configured in one piece of first indication information.

Optionally, the first indication information may activate or deactivate all configured CGs or CGs whose activation/deactivation states are changed accordingly by the base station. Therefore, only one piece of the first indication information is required, and accordingly, confirmation feedback is performed on the corresponding carrier without the information such as carrier index.

In addition, in this case, it may be understood that the existing LCID of Configured Grant Confirmation MAC CE is used. The existing Configured Grant Confirmation MAC CE format is used.

In the prior art, even if multiple CGs are configured, the network can only indicate activation/deactivation of one of the CG configurations in one piece of indication message. In R16, the network device may adopt a combined DCI, and activation/deactivation of multiple CGs configurations may be indicated simultaneously by using this DCI. This scenario provides a solution for how to report a confirmation in the combined DCI scenario, and proposes a manner with minimal signaling overhead and minimal protocol modification.

Scenario 2: on the basis of scenario 1, confirmation information of different granularity is set in this scenario.

The first confirmation information is confirmation information, fed back based on one of the terminal device, a cell group, the carrier, the CG, and the CG group, for activation or deactivation of the CG or CG group.

It should be understood that in the scenario 1, the first confirmation information is generated mainly for the granularity of the CG or the CG group. However, the present scenario adds a manner that the first confirmation information is generated for any granularity in the terminal device, the cell group, and the carrier.

It should be also noted that the method further includes the following operations.

The terminal device determines adoption of a granularity of one of the terminal device, the cell group, the carrier, the CG, and the CG group according to predefinition or an indication of the network device.

That is, in this scenario, the first confirmation information for activation/deactivation of the CG is fed back through the granularity based on the terminal device or the cell group or the carrier, so that the feedback delay is reduced, and the feedback efficiency is improved.

In particular, the manner of determining the granularity may include that the feedback granularity is determined according to one of the following: a type of the DCI, a format of the DCI, and a content of DCI.

For example, the first indication information (i.e., combined DCI) may be fed back using the granularity of the CG or the CG group.

Alternatively, the feedback granularity of the first confirmation information is determined according to the granularity corresponding to combined DCI. For example, if combined DCI indicates a carrier, it is determined that the feedback granularity is a carrier. Specifically, feedback is performed on a scheduled carrier indicated in the first indication information.

Same as scenario 1, the first confirmation information may also be carried by one of MAC CE, PHY signaling, and RRC.

In this scenario, when the first confirmation information is carried by the MAC CE, the MAC CE adopts the first LCID, and the MAC CE contains at least one of the following contents: cell group index, carrier index, CG index, and CG group index.

However, the size of MAC CE may be a fixed value or an unfixed value.

Specifically, the description of the first LCID is the same as that of the above Scenario 1, and details are not described herein. Similarly, the first LCID is used to identify confirmation indication corresponding to simultaneous activation/deactivation of the corresponding multiple CGs.

The new MAC CE carries at least one of the following: CG index and CG group index.

Although the modification of the size of MAC CE is a fixed value, it is able to be extended to 8 Octs, as example shown in FIG. 8.

In another case, the modification of the size of MAC CE is an unfixed value and it is expanded maximally to 8 Octs.

Figure 9:
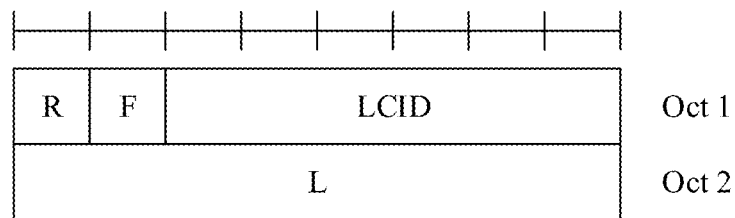
Figure 10:
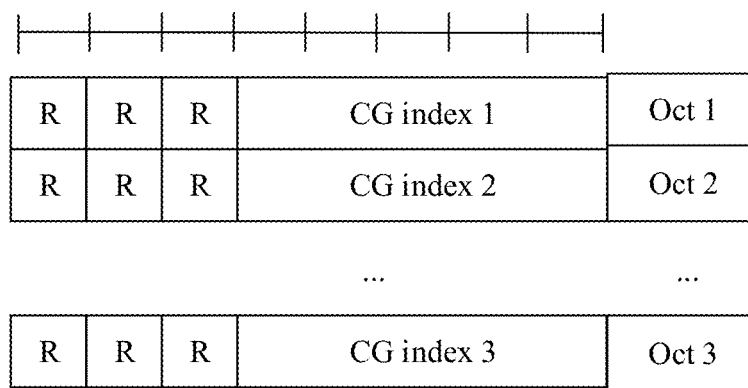

For example, with the carrier as the granularity, the confirmation information is provided in an ascending order of CG indexes. Only the confirmation of the activated/deactivated CG indicated in the DCI may be obtained. For example, as shown in FIG. 9 and FIG. 10, the DCI indicates the activation of CG index 1, the activation of CG index 2 and the activation of CG index 3, and the length of L in the sub-header of MAC CE is 3 Octs, and there is only the confirmation information of CG index 1, the confirmation information of CG index 2 and the confirmation information of CG index 3 in the MAC CE.

It should be noted that in the figures: L represents length field, which indicates the length size (in byte) of the corresponding MAC CE, or MAC Service Data Unit (SDU). F represents format field, which indicates the size of the length field. LCID is used to identify the type of MAC CE, such as whether or not it is the confirmation information MAC CE.

Figure 11:
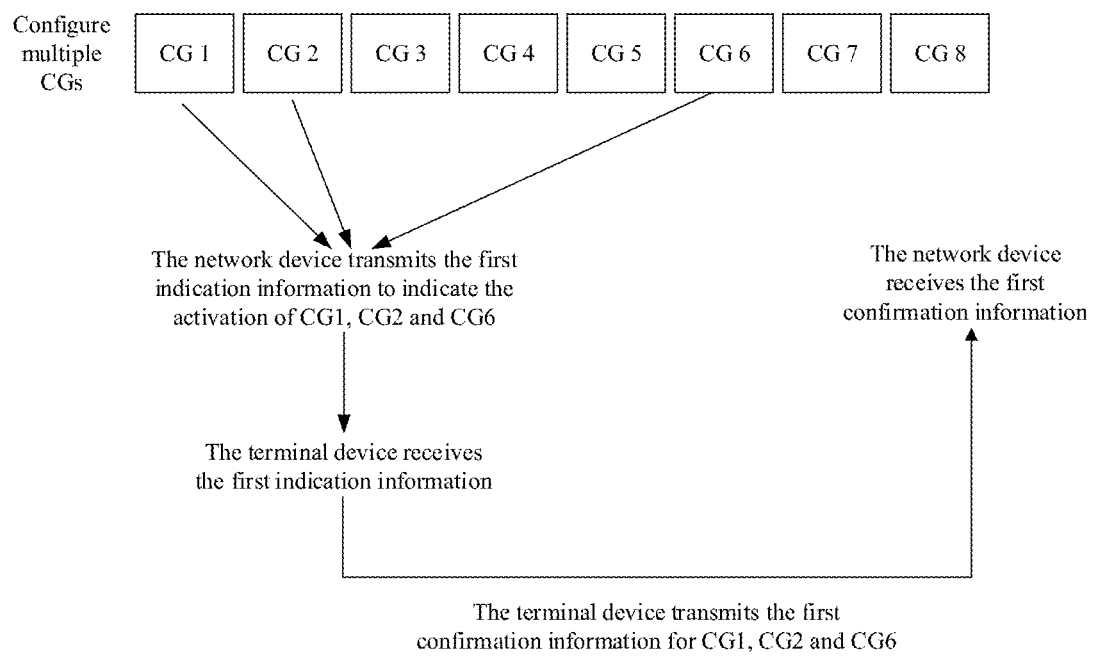
FIG. 11 is a fifth schematic flowchart of a method for processing information according to embodiments of the present disclosure.

The present scenario may refer to FIG. 11, which is different from the scenario 1 in that in the present scenario, the confirmation information for the CG1, CG2 and CG 6 may be transmitted in the first confirmation information, and it is not needed to transmit them separately.

In scenario 3, the network device transmits second indication information to the terminal device.

The second indication information includes one or more CGs or CG groups which are instructed by the network device for the terminal device to activate or deactivate.

Accordingly, the operation that indication information, sent by the network device, for activation or deactivation of a CG includes the following operation.

N pieces of second indication information from the network device are received.

The second indication information includes a CG or CG group which is instructed by the network device for the terminal device to activate or deactivate.

The operation that the confirmation information is fed back to the network device includes the following operation.

Second confirmation information for the second indication information is fed back to the network device.

That is, the network device receives the second confirmation information for the second indication information fed back by the terminal device.

That is, when the network device indicates the activation/deactivation states of the CGs or the CG groups in the multiple CGs by using the DCI, for example, when the activation/deactivation states of the multiple CGs are indicated by using the one by one DCI, that is, the activation/deactivation state of one CG is indicated in each DCI, the terminal device reports the confirmation state of whether the CG is activated by using the second confirmation information reporting signaling.

Similarly, this scenario is the same as scenario 1 in that the network device also performs CG or CG group configuration for the terminal device. The specific configuration is the same as scenario 1, and details are not described herein.

The second confirmation information is carried by one of the following: MAC CE, PHY signaling, RRC.

The second indication information may also be DCI.

Figure 12:
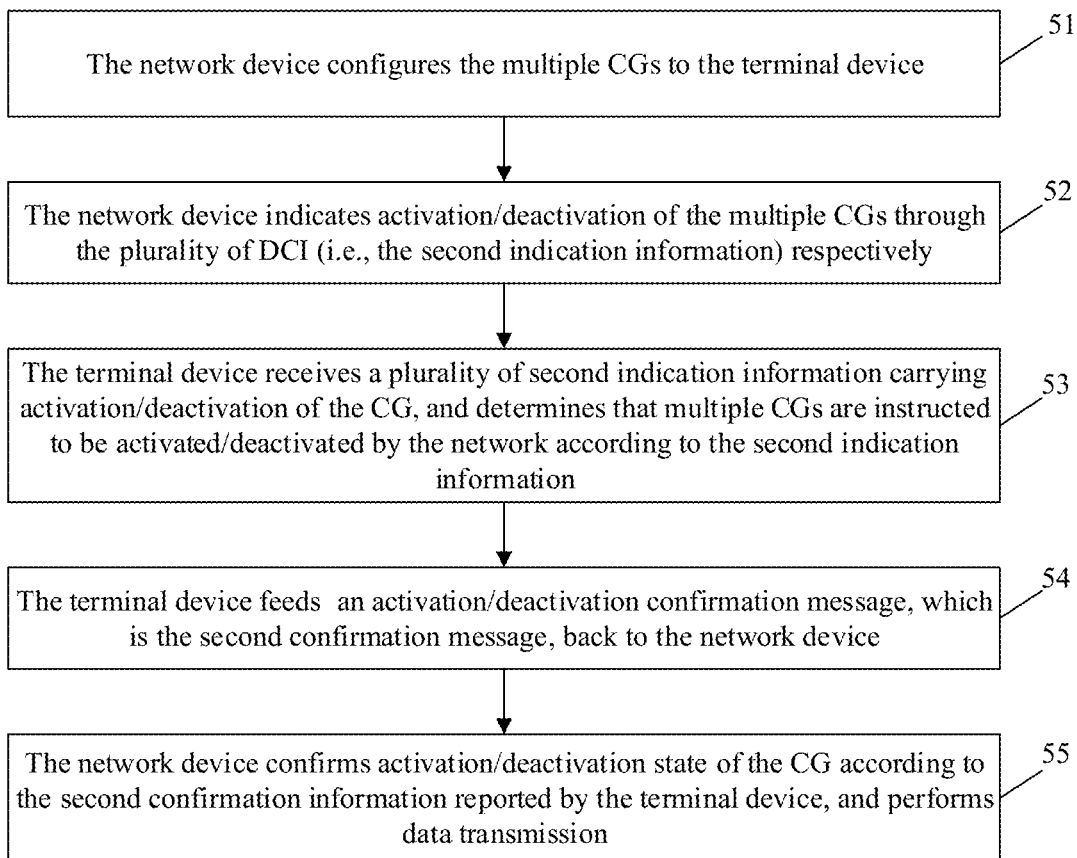
FIG. 12 is a sixth schematic flowchart of a method for processing information according to embodiments of the present disclosure.

Referring to FIG. 12, the following process may be included.

In operation 51, the network device configures the multiple CGs for the terminal device.

In operation 52, the network device indicates activation/deactivation of the multiple CGs (indicating one by one) through the plurality pieces of DCI (i.e., the second indication information) respectively, and the base station indicates the activated/deactivated CG index in the DCI. Alternatively, when the gNB configures the multiple CGs in a group configuration manner, the gNB may indicate activation/deactivation in a group manner, in which case the CG group index needs to be carried and the CG index does not need to be carried.

In operation 53, the terminal device receives a plurality pieces of second indication information carrying activation/deactivation of the CG, and determines that multiple CGs are indicated by the network for activation/deactivation according to the second indication information.

In operation 54, the terminal device feeds an activation/deactivation confirmation message, which is the second confirmation message, back to the network.

The message may be carried by MAC CE, PHY signaling, RRC. The message may carry confirmation information for one or more CGs. The message needs to carry at least one of the following information: cell group index, carrier index (UL or SUL), CG index, and CG group index. The cell group index is introduced mainly for feedback crossing MAC entities. For example, when one MAC entity has no resources, the cell group index may be fed back with the resource of another MAC entity to reduce the delay. Here, the carrier index is introduced since the base station configures the CG of one MAC entity separately for each carrier, and the CG indexes of two carriers may be the same, and the feedback is not limited to feeding back the corresponding confirmation information through the corresponding carrier.

In operation 55, the network device confirms activation/deactivation state of the CG according to the second confirmation information reported by the terminal device, and performs data transmission.

Specifically, when the confirmation information is carried in MAC CE, the optional MAC CE format is as follows.

First format: when the second confirmation information is carried by the MAC CE, the MAC CE adopts a first LCID, and the MAC CE contains at least one of the following: cell group index, carrier index, CG index, and CG group index.

That is, a new LCID is introduced and additional information is carried in the MAC CE. The detailed manner is the same as that of the category 1 of the MAC CE in the scenario 1, and details are not described herein.

Second format, similar to category 2 of MAC CE in scenario 1, when the second confirmation information is carried by MAC CE, the MAC CE adopts the second LCID and the MAC CE does not comprise content, the second LCID being different from the first LCD.

The method further includes feeding back the second confirmation information on a CG resource of a corresponding cell.

The operation that the second confirmation information is fed back on the CG resource of the corresponding cell includes at least one of the following operations.

The second confirmation information is fed back on a CG resource corresponding to a third carrier which corresponds to a carrier in which the second indication information is located.

The second confirmation information is fed back on a CG resource corresponding to a fourth carrier that is scheduled by the second indication information.

The operation that the second confirmation information is fed back on the CG resource of the corresponding cell also may be the operation that the second confirmation information is fed back on a corresponding carrier or a carrier that meets the preset condition. The limitation of the carrier is the same as that in scenario 1, and details are not described herein.

Further, if the terminal device finally determines to only activate or deactivate a part of the CGs or CG groups in the plurality of DCI, the terminal device also feeds the second confirmation information back on the CG or CG group resource which corresponds to the corresponding carrier or carrier that meets the preset condition.

Alternatively, there is an alternative solution in which the carrier may be replaced by a cell. That is, the second confirmation information is fed back on the CG or CG group resource corresponding to the cell in which the second indication information is located; and/or the second confirmation information is fed back on CG or CG group resource corresponding to the cell that is scheduled by the second indication information.

It should be understood that a difference from category 2 of MAC CE of scenario 1 is that Configured Grant Confirmation MAC CE of R15 is reused, but the usage limits are increased. The limitations may include the following limitation 1 and limitation 2.

Limitation 1: when the terminal device receives the activation/deactivation of the multiple CGs indicated through one by one DCI mode, if the Configured Grant Confirmation MAC CE of R15 is adopted for confirmation reporting, the UE performs confirmation feedback on the corresponding CG resource of the corresponding cell only.

Limitation 2: when the network device receives the Configured Grant Confirmation MAC CE of the R15 version transmitted by the UE of the R16, the network side receives the confirmation feedback on the corresponding CG resource of the corresponding cell. The base station determines that the activation/deactivation indication of CG transmitted in the previous DCI is confirmed by the UE.

It should be noted that the solution may also adopts the solution similar to that of the scenario 2. That is, the second confirmation information is confirmation information, fed back based on one of the terminal device, a cell group, the carrier, the CG, and the CG group, for activation or deactivation of the CG or CG group.

Similarly, the activation/deactivation confirmation information for the CG is fed back based on the granularity of the UE or the cell group or the carrier. The advantage is that the feedback delay is reduced and the feedback efficiency is improved.

Figure 13:
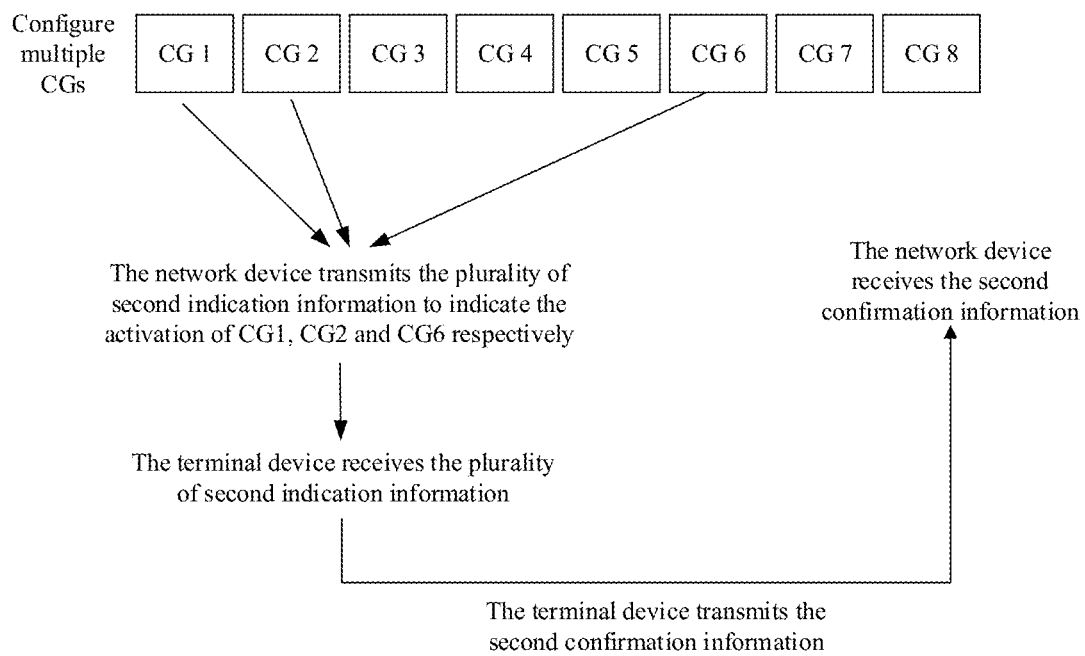
FIG. 13 is a seventh schematic flowchart of method for processing information according to embodiments of the present disclosure.

In a processing scenario of the present scenario, referring to FIG. 13, the network device preconfigures CG1~CG8. A plurality pieces of second indication information is transmitted to indicate activation of CG1, CG 2, and CG 6 by respectively transmitting the DCI. After the terminal device receives the second indication information, the second confirmation information is transmitted to the network device respectively.

In the previous scenario 1, scenario 2, and scenario 3, a plurality of cases of transmitting the first confirmation information and the second confirmation information are provided respectively. In practice, the terminal device may further determine to feed the first confirmation information or the second confirmation information back based on one of predefinition, an indication of the network device, a content of a DCI, a format of the DCI, and a type of the DCI.

The indication of the network device may be understood as third indication information. That is, the first confirmation information or the second confirmation information may be determined to be fed back through the third indication information carried by RRC or DCI. The predefinition may be understood that the first confirmation information is fed back once the first indication information is received, and the second confirmation information is fed back once the second indication information is received.

In the prior art, even if multiple CGs are configured, the network may only indicate activation/deactivation of one of the CG configurations in one DCI. In the prior art of R15, a network device transmits one piece of DCI and then transmits another piece of DCI after the confirmation state of the DCI is fed back, so that the UE is staggered in time to avoid feeding back multiple pieces of confirmation information at the same time. In R16, the restriction is broken, that is, the base station may transmit multiple pieces of DCI in a certain time to indicate activation/deactivation of multiple CGs respectively. In this case, it is necessary to consider how does the UE feed the confirmation state back to the network device. The advantage of the present solution is that a scheme of combined feedback confirmation information is provided, so that the feedback delay is reduced, and the feedback efficiency is improved.

Finally, it should also be noted that since CG index and CG group index are not involved in the prior mechanisms, and only the triggering/cancelling of the configured uplink grant confirmation of the UE or carrier is involved in, the triggering/cancelling of the configured uplink grant confirmation of CG index or CG group index is not involved in. This is not applicable in R16.

Therefore, in the solution provided in the present embodiment, a confirmation of triggering/cancelling CG or CG group for the terminal device will be described.

The method further includes the following operations.

An uplink grant confirmation for a triggered configuration to the network device is triggered based on a CG or a CG group.

Alternatively, an uplink grant confirmation for feeding back a configuration to the network device is cancelled based on CG or CG group.

CG index is taken as an example below. For the MAC entity, the trigger mechanism for each PDCCH occasion is as follows.

1. if an uplink grant for this PDCCH occasion has been received for this Serving Cell on the PDCCH for the MAC entity's CS-RNTI;
2. if the NDI in the received HARQ information is 0;
3. if PDCCH contents indicate configured grant Type 2 deactivation;
4. trigger configured uplink grant confirmation for configured grant index;
3. else if PDCCH contents indicate configured grant Type 2 activation;
4. trigger configured uplink grant confirmation for configured grant index.

Modifying the cancellation of the existing configured uplink grant confirmation is as follows.
For the MAC entity:
1. if the configured uplink grant confirmation for configured grant index has been triggered and not cancelled; and
1. if the MAC entity has UL resources allocated for new transmission;

2. instruct the Multiplexing and Assembly procedure to generate an Configured Grant Confirmation MAC CE as defined in subclause 6.1.3.7 (it should be pointed out that the reference position may be changed, the description here makes reference to the description sections of the above first confirmation message or second confirmation message in the protocol); and 2. cancel the triggered configured uplink grant confirmation for configured grant index.

It should be noted that the uplink grant confirmation based on the configuration of the CG or the CG group and the uplink grant confirmation based on the configuration of the UE may be supported at the same time or only one of them may be supported.

It should also be noted that the solutions provided in the embodiments may also be applied to the activation/deactivation of multiple Semi-Persistent Scheduling (SPS), and the specific solutions may be the same as the solutions of the embodiments, except that at least one of the following. In the process of activation or deactivation of the multi-SPS, the first indication information or the second indication information, i.e., the DCI, needs to carry the SPS/SPS group index. The terminal device does not need to transmit confirmation information to the network device.

It should be noted that the maximum number of configured and/or activated SPSs may be one of 8, 12, 16, 20 and 24. Alternatively, the limitation of the maximum number of SPSs may be for at least one of the following: for the UE, for the cell, for the carrier, for the BWP, for the cell group, for the service, and for the logical channel.

It should also be noted that the maximum number of configured and/or activated CGs may be one of 8, 12, 16, 20 and 24.

Alternatively, the limitation of the maximum number of CG may be for at least one of the following: for the UE, for the cell, for the carrier, for the Band Width Part (BWP), for the cell group, for the service, and for the logical channel.

It can be seen that by using the above solutions, after the indication information indicating activation or deactivation of the CG is received, when the confirmation information is fed back to the network device, the confirmation information is generated by a certain preset condition, or the confirmation information is generated by including one of a cell group index, a carrier index, a CG index, and a CG group index in the confirmation information. Thus, the problem of how does the UE feed the activation/deactivation confirmation information of CG back in the prior art is solved, and the problem of inconsistent understanding of the confirmation information between the network device and the terminal device is avoided by adding the relevant information of the carrier, CG or CG group to the confirmation information.

In addition, with the above solutions, the feedback delay is reduced and the feedback efficiency is improved.

Figure 14:
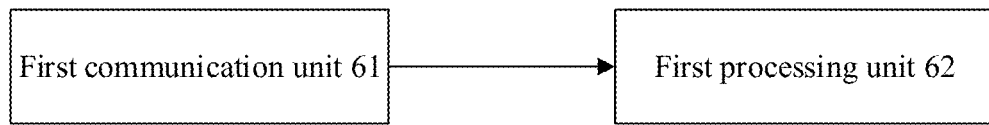
FIG. 14 is a schematic structural diagram of a terminal device according to embodiments of the present disclosure.

Embodiments of the present disclosure provide a terminal device, as shown in FIG. 14. The terminal device includes a first communication unit 61.

The first communication unit 61 is configured to receive indication information sent by a network device for activation or deactivation of the CG, and feed confirmation information back to the network device.

The confirmation information is information fed back on a carrier that meets a preset condition, and/or the confirmation information contains at least one of the following: a cell group index, a carrier index, a CG index, and a CG group index.

Figure 15:
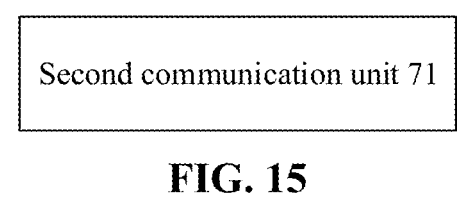

In addition, as shown in FIG. 15, the network device provided in the embodiments includes a second communication unit 71.

The second communication unit 71 is configured to transmit indication information for activation or deactivation of the CG to the terminal device and receive confirmation information fed back by a terminal device.

The confirmation information is information fed back on a carrier that meets a preset condition, and/or the confirmation information contains at least one of a cell group index, a carrier index, a CG index, and a CG group index.

In the embodiments, the network device may be a base station device on the network side, such as a gNB.

The following describes the situations of a plurality of different scenarios in the embodiments of the present disclosure with reference to the types of the plurality of indication information.

Scenario 1

The second communication unit 71 is configured to transmit first indication information to the terminal device.

The first indication information includes M CGs which are instructed by the network device for the terminal device to activate or deactivate, and M is an integer greater than or equal to 1.

Alternatively, the first indication information includes at least one group of CGs which are instructed by the network device for the terminal device to activate or deactivate and each group of the at least one group of CGs includes at least one CG.

That is, the first communication unit 61 receives the first indicated information sent from the network device.

The first indication information includes M CGs which are instructed by the network device for the terminal device to activate or deactivate, and M is an integer greater than or equal to 1.

Alternatively, the first indication information includes at least one group of CGs which are instructed by the network device for the terminal device to activate or deactivate and each group of the at least one group of CGs includes at least one CG.

The first indication information in this scenario may be DCI information. Specifically, the network device performs indication by using Combined DCI.

In addition, the second communication unit 71 may perform CG configuration for the terminal device before the above processing.

When the network device transmits the first indication information to the terminal device, a bitmap may be used. That is, the first indication information (i.e., Combined DCI) includes a bitmap.

A value of a length of the bitmap is a maximum number of CGs supported by the network device, or is a maximum number of CGs supported by the terminal device, or is a maximum number of CGs configured for the terminal device, or is a maximum number of CGs activated by the terminal device, or is a predefined number of CGs, or is a predefined maximum number of CGs, and, different bits in the bitmap are used to indicate activation or deactivation of different CGs. For example, it may be set that when the bit value is 1, the CG indication corresponding to the bit is in an activated state, and when the bit value is 0, the CG indication corresponding to the bit is deactivated. Of course, vice versa, details are not described herein.

Alternatively, the value of the length of the bitmap is a maximum number of CG groups supported by the network device, or is a maximum number of CG groups supported by the terminal device, or is a maximum number of CG groups configured for the terminal device, or is a maximum number of CG groups activated by the terminal device, or is a predefined number of CG groups, or is a predefined maximum number of CG groups, and different bits in the bitmap are used to indicate activation or deactivation of different CG groups. That is, when the network device configures the multiple CGs in a group configuration manner, the network device may indicate activation/deactivation in a CG group manner. In such a manner, the first indication information, i.e., the DCI, carries the CG group index, and may not need to carry the CG index. A bit in the bitmap corresponds to a CG group, and it may be set to indicate that the network device indicates activation of the CG group corresponding to the bit when the value of the bit is 1, and the network device indicates deactivation of the CG group corresponding to the bit when the value of the bit is 0. Of course, vice versa, details are not described herein.

It should also be noted that the order of the CGs or CG groups in the bitmap may be in ascending or descending order of CG indexes and CG group indexes. Further, when indicating at least one carrier, the bitmaps may be set by sorting CGs or CG groups of each carrier and in a manner of sorting the carriers.

When indicating at least one carrier and at least one cell group, the bitmap may be set in a manner of sorting the CGs or CG groups of all carriers, sorting the carriers and sorting the cell groups, or the bit may be set by sorting the CGs and CG groups of all cell groups and in a manner of sorting the cell groups.

The first confirmation information may be carried by one of MAC CE, PHY signaling, and RRC.

Further, in the present scenario, the format of the first confirmation information is described through the following categories. It should be noted that regardless of the type of the format used, a state of one CG or CG group may be fed back in the first confirmation information, or states of a plurality of CGs or CG groups may be fed back, which is specifically described as follows.

Category 1

When the first confirmation information is carried by the MAC CE, the MAC CE adopts a first LCD, and the MAC CE contains at least one of the following: the cell group index, the carrier index, the CG index, and the CG group index.

It should be understood that the first LCID is not identical to the LCID defined in the prior art, in particular LCID is other than 55.

In the present scenario, a number of the first LCID in the present scenario is a number, which may be configured according to the actual situation which is not limited in the present embodiments.

In addition to introducing a new LCID in this category, it is set that additional information may be carried in the MAC CE. That is, another difference from the prior art is that content may carried in the MAC CE instead of the size=0.

By introducing a new LCID, a confirmation indication corresponding to simultaneous activation/deactivation of the multiple CGs is represented.

The new MAC CE carries at least one of the following: carrier index (UL or SUL), CG index, CG group index.

Alternatively, a new feedback manner that LCID+adding crossed the cell group may be introduced It is the same as the above in that the first LCID may be introduced for identifying the MAC CE as the first confirmation information for simultaneous activation/deactivation of the corresponding multiple CGs.

The new MAC CE may contain at least one of the following: cell group index, carrier index (UL or SUL), CG index, and CG group index Category 2

When the first confirmation information is carried by a MAC CE, the MAC CE adopts a second LCD, and the MAC CE does not contain content the second LCID being different from the first LCD.

The first communication unit is configured to feed the first confirmation information back through a corresponding carrier or a carrier that meets the preset condition.

It should be noted that in the present category, the second LCID may be numbered 55. That is, the confirmation information of an configured grant resource as specified in the prior art protocol.

That is, the Configured Grant Confirmation MAC CE of R15 is reused, but the usage limitations are increased. The advantage is that the existing protocols may be reused. However, since the one by one DCI indication mode and the combined DCI indication mode may coexist, it is necessary to specify usage limitation in the MAC protocol.

However, the present disclosure adds a limitation to it. That is, the first confirmation information only is fed back on a carrier corresponding to the first indication information or a carrier that meets a preset condition.

The operation that the first confirmation information is fed back on a corresponding carrier or the carrier that meets the preset condition includes at least one of the following operations.

The first confirmation information is fed back on a first carrier corresponding to a carrier in which the first indication information is located.

The first confirmation information is fed back on a second carrier that is scheduled by the first indication information.

It should also be noted that the first confirmation information may also be fed back in a corresponding cell or in a cell that meets the preset condition.

That is, there may be an alternative solution in the processing. That is, the above carrier may be replaced by a cell. That is, the first confirmation information is fed back in the cell of the first indication information, and/or the first confirmation information is fed back in the cell that is scheduled by the first indication information.

Further, if the terminal device may finally determine to only activate or deactivate a part of the CGs or CG groups in the combined DCI (i.e., the first indication information), the first confirmation information may also be fed back on the CG or CG group resource that corresponds to a corresponding carrier or a carrier that meets the preset condition.

Scenario 2: on the basis of scenario 1, confirmation information of different granularity is set in this scenario.

The first confirmation information is confirmation information, fed back based on one of the terminal device, a cell group, the carrier, the CG, and the CG group, for activation or deactivation of the CG or CG group In particular, the manner of determining the granularity may include that the feedback granularity is determined according to one of the following: a type of the DCI, a format of the DCI, and a content of DCI.

For example, the first indication information (i.e., combined DCI) may be fed back using the granularity of the CG or the CG group.

Alternatively, the feedback granularity of the first confirmation information is determined according to the granularity corresponding to combined DCI. For example, if combined DCI indicates a carrier, it is determined that the feedback granularity is a carrier. Specifically, feedback is performed on a scheduled carrier indicated in the first indication information.

It should be understood that in the scenario 1, the first confirmation information is generated mainly for the granularity of the CG or the CG group. However, the present scenario adds a manner that the first confirmation information is generated for any granularity in the terminal device, the cell group, and the carrier.

It should also be noted that the terminal device further includes a first processing unit 62.

The first processing unit 62 is configured to determine adoption of a granularity of one of the terminal device, the cell group, the carrier, the CG, and the CG group according to predefinition or an indication of the network device.

The adoption of a granularity of one of the terminal device, the cell group, the carrier, the CG, and the CG group is determined according to predefinition or an indication of the network device That is, in this scenario, the first confirmation information for activation/deactivation of the CG is fed back through the granularity based on the terminal device or the cell group or the carrier, so that the feedback delay is reduced, and the feedback efficiency is improved.

Same as scenario 1, the first confirmation information may also be carried by one of MAC CE, PHY signaling, and RRC.

In this scenario, when the first confirmation information is carried by the MAC CE, the MAC CE adopts the first LCID, and the MAC CE contains at least one of the following contents: cell group index, carrier index, CG index, and CG group index.

However, the size of MAC CE may be a fixed value or an unfixed value.

Specifically, the description of the first LCID is the same as that of the above Scenario 1, and details are not described herein. Similarly, the first LCID is used to identify confirmation indication corresponding to simultaneous activation/deactivation of the corresponding multiple CGs.

The new MAC CE carries at least one of the following: CG index, CG group index.

Although the modification of the size of MAC CE is a fixed value, and it is able to be extended to 8 Octs, as example shown in FIG. 9.

In another case, the modification of the size of MAC CE is an unfixed value and it is expand maximally to 8 Octs.

In scenario 3, network device transmits second indication information to the terminal device through a second communication unit.

The second indication information includes one or more CGs or CG groups which are instructed by the network device for the terminal device to activate or deactivate.

Correspondingly, the terminal device receives N pieces of second indication information sent by the network device through the first communication unit.

The second indication information includes a CG or CG group which is instructed by the network device for the terminal device to activate or deactivate.

The operation that the confirmation information is fed back to the network device includes the following operation.

The terminal device feeds second confirmation information for the second indication information back to the network device through the first communication unit.

That is, the network device receives the second confirmation information for the second indication information fed back by the terminal device through the second communication unit.

Similarly, this scenario is the same as scenario 1 in that the network device also performs CG or CG group configuration for the terminal device. The specific configuration is the same as scenario 1, and details are not described herein.

The second confirmation information is carried by one of the following: MAC CE, PHY signaling, RRC.

The second indication information may also be DCI.

Specifically, when the confirmation information is carried in MAC CE, the optional MAC CE format is as follows/

First format: when the second confirmation information is carried by the MAC CE, the MAC CE adopts a first LCID, and the MAC CE contains at least one of the following: cell group index, carrier index, CG index, and CG group index.

That is, a new LCID is introduced and additional information is carried in the MAC CE. The detailed manner is the same as that of the category 1 of the MAC CE in the scenario 1, and details are not described herein.

A second format, similar to category 2 of MAC CE in scenario 1, when the second confirmation information is carried by MAC CE, the MAC CE adopts the second LCID and the MAC CE contains nothing, the second LCID being different from the first LCID.

The method further includes feeding back the second confirmation information on CG resource of a corresponding cell.

The operation that the second confirmation information is fed back on the CG resource of the corresponding cell includes at least one of the following operations The second confirmation information is fed back on a CG resource corresponding to a third carrier which corresponds to a carrier in which the second indication information is located.

The second confirmation information is fed back on a CG resource corresponding to a fourth carrier that is scheduled by the second indication information.

The operation that the second confirmation information is fed back on the CG resource of the corresponding cell also may be the operation that the second confirmation information is fed back on a corresponding carrier or a carrier that meets the preset condition. The limitation of the carrier is the same as that in scenario 1, and details are not described herein.

Further, if the terminal device finally determines to merely activate or deactivate a part of the CGs or CG groups in the plurality of DCI, the terminal device also feeds the second confirmation information back on the CG or CG group resource which corresponds to the corresponding carrier or carrier that meets the preset condition.

Alternatively, there is an alternative solution in which the carrier may be replaced by a cell. That is, the second confirmation information is fed back on the CG or CG group resource corresponding to the cell in which the second indication information is located; and/or the second confirmation information is fed back on CG or CG group resource corresponding to the cell that is scheduled by the second indication information.

In the previous scenario 1, scenario 2, and scenario 3, a plurality of cases of transmitting the first confirmation information and the second confirmation information are provided respectively. In practice, the terminal device may further include a first processing unit configured to determine to feed the first confirmation information or the second confirmation information back based on one of predefinition, an indication of the network device, a content of a DCI, a format of the DCI, and a type of the DCI. The indication of the network device may be understood as third indication information. That is, the first confirmation information or the second confirmation information may be determined to be fed back through the third indication information carried by RRC or DCI. The predefinition may be understood that the first confirmation information is fed back once the first indication information is received, and the second confirmation information is fed back once the second indication information is received.

Finally, it should also be noted that since CG index and CG group index are not involved in the prior mechanisms, and only the triggering/cancelling of the configured uplink grant confirmation of the UE or carrier is involved in, the triggering/canceling of the configured uplink grant confirmation of CG index or CG group index is not involved in. This is not applicable in R16.

Therefore, in the solution provided in the present embodiments, a confirmation of triggering/cancelling CG or CG group for the terminal device will be described.

The first processing unit of the terminal device is configured to trigger a configured uplink grant confirmation for triggering the network device based on CG or CG group; or cancel a configured uplink grant confirmation for feeding back to the network device based on CG or CG group.

It should also be noted that the solutions provided in the embodiment may also be applied to the activation/deactivation of multiple Semi-Persistent Scheduling (SPS), and the specific solutions may be the same as the solutions of the embodiments, except that at least one of the following. In the process of activation or deactivation of the multi-SPS, the first indication information or the second indication information, i.e., the DCI, needs to carry the SPS/SPS group index. The terminal device does not need to transmit confirmation information to the network device.

It should be noted that the maximum number of configured and/or activated SPSs may be one of 8, 12, 16, 20 and 24. Alternatively, the limitation of the maximum number of SPSs may be for at least one of the following: for the UE, for the cell, for the carrier, for the BWP, for the cell group, for the service, and for the logical channel.

It should also be noted that the maximum number of configured and/or activated CGs may be one of 8, 12, 16, 20 and 24.

Alternatively, the limitation of the maximum number of CG may be for at least one of the following: for the UE, for the cell, for the carrier, for the BWP, for the cell group, for the service, and for the logical channel.

It can be seen that by using the above solutions, after the indication information indicating activation or deactivation of the CG is received, when the confirmation information is fed back to the network device, the confirmation information is generated by a certain preset condition, or the confirmation information is generated by including one of a cell group index, a carrier index, a CG index, and a CG group index in the confirmation information. Thus, the problem of how does the UE feed the activation/deactivation confirmation information of CG back in the prior art is solved, and the problem of inconsistent understanding of the confirmation information between the network device and the terminal device is avoided by adding the relevant information of the carrier, CG or CG group to the confirmation information.

In addition, with the above solutions, the feedback delay is reduced and the feedback efficiency is improved.

Figure 16:
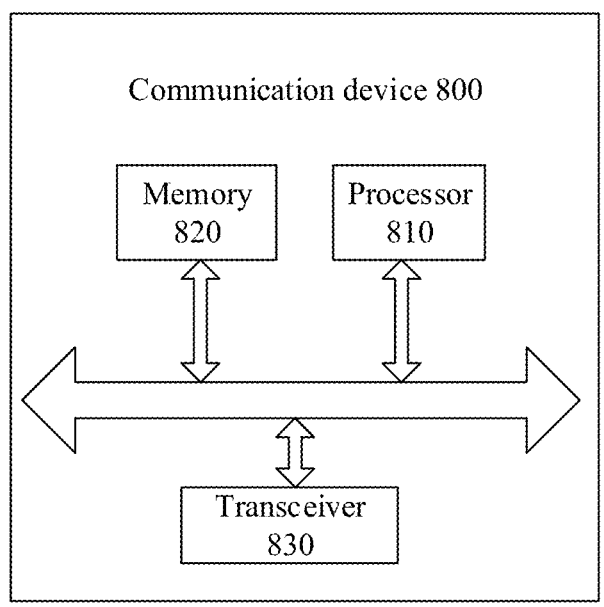
FIG. 16 is a schematic structural diagram of a communication device according to embodiments of the present disclosure.

FIG. 16 is a schematic block diagram of a communication device 800 according to embodiments of the present disclosure. The communication device in the embodiments may be a terminal device or a network device in the above embodiments. The communication device 800 shown in FIG. 16 includes a processor 810. The processor 810 calls and executes computer programs from memory to implement the method in embodiments of the present disclosure.

Alternatively, as shown in FIG. 16, the communication device 800 may also include a memory 820. The processor 810 may call and execute computer programs from the memory 820 to implement the method in embodiments of the present disclosure.

The memory 820 may be a separate device independent of the processor 810, or may be integrated in the processor 810.

Alternatively, as shown in FIG. 16, the communication device 800 may also include a transceiver 830. The transceiver 830 may be controlled by the processor 810 to communicate with other devices. Specifically, the transceiver 830 may transmit information or data to other devices or receive information or data transmitted by other devices.

The transceiver 830 may include a transmitter and a receiver. The transceiver 830 may further include antenna, and the number of antennas may be one or more.

Alternatively, the communication device 800 may be specifically a network device according to embodiments of the present disclosure, and the communication device 800 may implement corresponding flows implemented by the network device in the various methods according to the embodiments of the present disclosure. For brevity, details are not described herein.

Alternatively, the communication device 800 may be specifically a terminal device or a network device according to the embodiments of the present disclosure, and the communication device 800 may implement corresponding flows implemented by the mobile terminal/terminal device in the various methods according to the embodiments of the present disclosure. For brevity, details are not described herein.

Figure 17:
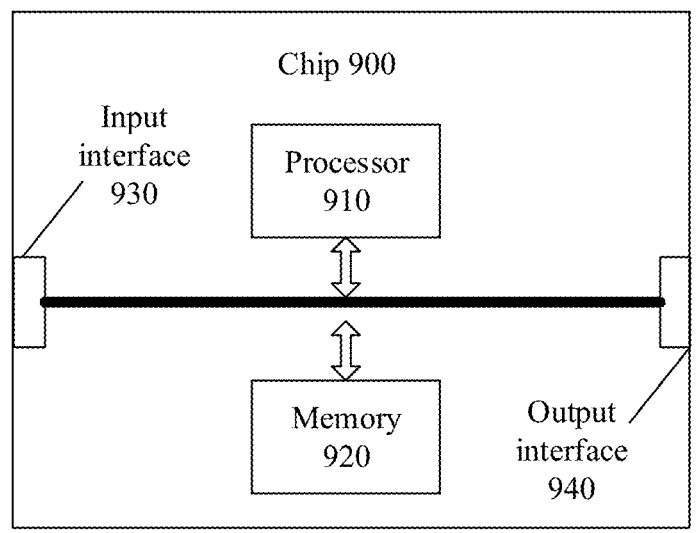
FIG. 17 is a schematic block diagram of a chip according to embodiments of the present disclosure.

FIG. 17 is a schematic block diagram of a chip according to embodiments of the present disclosure. The chip 900 shown in FIG. 17 includes a processor 910. The processor 910 calls and executes computer programs from memory to implement the methods according to the embodiments of the present disclosure.

Alternatively, as shown in FIG. 17, the chip 900 may also include a memory 920. The processor 910 may call and execute computer programs from the memory 920 to implement the methods in embodiments of the present disclosure.

The memory 920 may be a separate device independent of the processor 910, or may be integrated in the processor 910.

Alternatively, the chip 900 may also include an input interface 930. The processor 910 may control the input interface 930 to communicate with other devices or chips, and specifically, may acquire information or data transmitted by other devices or chips.

Alternatively, the chip 900 may also include an output interface 940. The processor 910 may control the output interface 940 to communicate with other devices or chips, and specifically may output information or data to other devices or chips.

Alternatively, the chip may be applied to a terminal device or a network device in the embodiments of the present disclosure, and the chip may implement corresponding flows implemented by the terminal device in each method according to the embodiments of the present disclosure. For brevity, details are not described herein.

It should be understood that the chip mentioned in the embodiments of the present disclosure may also be referred to as a system-level chip, a system chip, a chip system or a system-on-chip chip, or the like.

It should be understood that the processor of the embodiments of the present disclosure may be an integrated circuit chip having signal processing capabilities. In the process of implementation, the steps of the above method embodiments may be implemented by integrated logic circuits of hardware in the processor or instructions in the form of software. The processors described above may be general purpose processors, Digital Signal Processor (DSP), Application Specific Integrated Circuit (ASIC), Field Programmable Gate Array (FPGA) or other programmable logic devices, discrete gate or transistor logic devices, discrete hardware components. The methods, steps, and logical block diagrams disclosed in the embodiments of the present disclosure may be implemented or performed. The general purpose processor may be a microprocessor or the processor may be any conventional processor or the like. The steps of the method disclosed in connection with the embodiments of the present disclosure may be directly implemented by a hardware decoding processor or by a combination of hardware and software modules in the decoding processor. The software module may be located in a storage medium mature in the art such as a random access memory, a flash memory, a read-only memory, a programmable read-only memory, or an electrically erasable programmable memory, a register, or the like. The storage medium is located in a memory, and the processor reads information in the memory and performs the steps of the above methods in conjunction with its hardware.

It should be understood that the memory in embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM), or flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

It should be understood that the above memory is exemplary, but not limiting, and that the memory in the embodiments of the present disclosure may be, for example, static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and Direct Rambus RAM (DR RAM), and the like. That is, the memory in the embodiments of the present disclosure is intended to include, but is not limited to, these and any other suitable types of memory.

Figure 18:
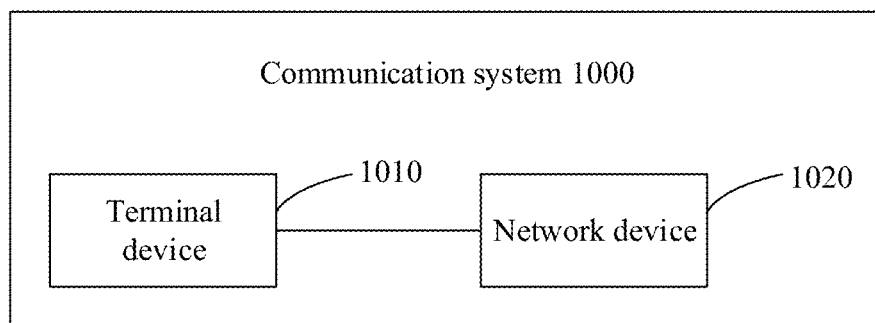
FIG. 18 is a second schematic diagram of a communication system architecture according to embodiments of the present disclosure.

FIG. 18 is a schematic block diagram of a communication system 1000 according to embodiments of the present disclosure. As shown in FIG. 18, the communication system 1000 includes a terminal device 1010 and a network device 1020.

The terminal device 1010 may be used to implement the corresponding functions implemented by the terminal device in the above methods, and the network device 1020 may be used to implement the corresponding functions implemented by the network device in the above methods. For brevity, details are not described herein.

The embodiments of the present disclosure further provide a computer readable storage medium for storing computer programs.

Alternatively, the computer readable storage medium may be applied to the network device in the embodiments of the present disclosure, and the computer programs cause the computer to perform the corresponding flows implemented by the network device in the obvious methods according to the embodiments of the present disclosure. For brevity, details are not described herein.

Alternatively, the computer readable storage medium may be applied to the terminal device in the embodiments of the present disclosure, and the computer programs cause the computer to perform the corresponding flows implemented by the mobile terminal/terminal device in the obvious methods according to the embodiments of the present disclosure. For brevity, details are not described herein.

The embodiments of the present disclosure also provide a computer program product including computer program instructions.

Alternatively, the computer program product may be applied to the network device in the embodiments of the present disclosure, and the computer program instructions cause the computer to perform the corresponding flows implemented by the network device in the each method according to the embodiments of the present disclosure. For brevity, details are not described herein.

Alternatively, the computer program product may be applied to the mobile terminal/terminal device in the embodiments of the present disclosure, and the computer program instructions cause the computer to perform the corresponding flows implemented by the mobile terminal/terminal device in the each method according to the embodiments of the present disclosure. For brevity, details are not described herein.

The embodiments of the disclosure also provide computer programs.

Alternatively, the computer programs may be applied to the network device in the embodiment of the present disclosure. The computer programs, when running on a computer, cause the computer to execute the corresponding flow implemented by the network device in each method according to the embodiments of the present disclosure. For brevity, details are not described herein.

Alternatively, the computer programs may be applied to the mobile terminal/terminal device in the embodiments of the present disclosure, and the computer programs, when running on a computer, cause the computer to execute the corresponding flow implemented by the mobile terminal/terminal device in each method according to the embodiments of the present disclosure. For brevity, details are not described herein.

Those of ordinary skill in the art will recognize that the elements and algorithm steps of the examples described in connection with the embodiments disclosed herein be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It should be known to those skilled in the art that for the convenience and brevity of the description, reference may be made to the corresponding processes in the above method embodiments for the specific working procedures of the above systems, apparatuses and units, and details will not be described herein.

In the several embodiments provided in the present disclosure, it should be understood that the disclosed systems, apparatus, and methods may be implemented in other ways. For example, the device embodiments described above are merely illustrative, for example, the division of the cells is merely a logical functional division, and there may be additional division in practice, for example, a plurality of cells or components may be combined or integrated into another system, or some features may be ignored or not performed. On the other hand, the coupling or direct coupling or communication connection between each other shown or discussed may be through some interface, indirect coupling or communication connection of a device or unit, and may be in electrical, mechanical or other form.

The elements illustrated as separate elements may or may not be physically separate, and the elements shown as elements may or may not be physical elements, may be located at one location, or may be distributed across multiple network elements. Some or all of the elements may be selected according to actual needs to achieve the objectives of the embodiments.

In addition, the functional units in the various embodiments of the present disclosure may be integrated in one processing unit, may be separate physical units, or may be integrated in two or more units.

The functions, if implemented as software functional units and sold or used as separate products, may be stored in a computer-readable storage medium. On the basis of such an understanding, the technical solutions of the present disclosure may essentially be embodied in the form of a software product, which is stored in a storage medium and includes instructions for causing a computer device (which may be a personal computer, a server, a network device, or the like) to perform all or part of the steps of the methods described in the various embodiments of the present disclosure. The storage medium includes a USB flash drive, a removable hard disk, a Read-Only Memory (Read-Only Memory) ROM, a Random Access Memory (Random Access Memory), a magnetic disk, or an optical disk.

The above description is merely specific embodiments of the present disclosure, but the scope of protection of the present disclosure is not limited thereto. Variations or substitutions may readily occur to those skilled in the art within the technical scope disclosed in the present disclosure, and are intended to be included within the scope of protection of the present disclosure. Accordingly, the scope of protection of the present disclosure shall be as described with reference to the scope of protection of the claims.

The invention claimed is:

1. A method for processing information, applied to a terminal device, comprising:
   receiving indication information, sent by a network device, for activation or deactivation of a Configured Grant Confirmation (CG); and
   feeding back confirmation information to the network device,
   wherein the confirmation information contains a CG index,
   wherein receiving the indication information, sent by the network device, for deactivation of the CG comprises:
   receiving a first indication information from the network device,
   wherein the first indication information comprises at least one group of CGs which are instructed by the network device for the terminal device to deactivate, and each group of the at least one group of CGs comprises at least one CG,
   wherein feeding back the confirmation information to the network device comprises:
   feeding back a first confirmation information for the first indication information to the network device,
   wherein the first confirmation information is:
   confirmation information, fed back based on a cell group, for deactivation of the CG, wherein the cell group comprises more than one cell,
   wherein the first indication information comprises a bitmap,
   the value of the length of the bitmap is a predefined maximum number of CG groups, and different bits in the bitmap are used to indicate deactivation of different CG groups, wherein each CG group comprises more than one CG.

2. The method of claim 1, wherein the first confirmation information is carried by
   a Medium access control (MAC) control element (CE).

3. The method of claim 1, wherein the confirmation information further contains a cell group index.

4. A method for processing information, applied to a network device, comprising:
   transmitting indication information for activation or deactivation of a Configured Grant Confirmation (CG) to a terminal device;
   receiving confirmation information fed back by the terminal device;
   wherein the confirmation information contains a CG index,
   wherein transmitting the indication information for deactivation for the CG to the terminal device comprises:
   transmitting a first indication information to the terminal device;
   wherein the first indication information comprises at least one group of CGs which are instructed by the network device for the terminal device to deactivate, and each group of the at least one group of CGs comprises at least one CG,
   wherein receiving the confirmation information fed back by the terminal device comprises:
   receiving a first confirmation information for the first indication information fed back by the terminal device,
   wherein the first confirmation information is:
   confirmation information, fed back based on a cell group, for deactivation of the CG, wherein the cell group comprises more than one cell,
   wherein the first indication information comprises a bitmap,
   the value of the length of the bitmap is a predefined maximum number of CG groups, and different bits in the bitmap are used to indicate deactivation of different CG groups, wherein each CG group comprises more than one CG.

5. The method of claim 4, wherein the first confirmation information is carried by
   a Medium access control (MAC) control element (CE).

6. The method of claim 4, wherein the confirmation information further contains a cell group index.

7. A terminal device comprising a transceiver, a processor and a memory for storing computer programs capable of running on the processor,
   wherein the memory is configured to store the computer programs, and the processor is configured to call and execute the computer programs stored in the memory to:
   control the transceiver to receive indication information, sent by a network device, for activation or deactivation of a Configured Grant Confirmation (CG) and feed confirmation information back to the network device, wherein the confirmation information contains a CG index, wherein the processor is further configured to control the transceiver to receive first indication information from the network device, wherein the first indication information comprises at least one group of CGs which are instructed by the network device for the terminal device to deactivate, and each group of the at least one group of CGs comprises at least one CG, wherein the first communication unit is configured to feed a first confirmation information for the first indication information back to the network device, wherein the first confirmation information is:

confirmation information, fed back based on a cell group, for deactivation of the CG, wherein the cell group comprises more than one cell, wherein the first indication information comprises a bitmap, the value of the length of the bitmap is a predefined maximum number of CG groups, and different bits in the bitmap are used to indicate deactivation of different CG groups, wherein each CG group comprises more than one CG.

8. The terminal device claim 7, wherein the first confirmation information is carried by
a Medium access control (MAC) control element (CE).

9. The terminal device of claim 7, wherein the confirmation information further contains a cell group index.

* * * * *